(12) United States Patent
Amir et al.

(10) Patent No.: US 9,928,251 B2
(45) Date of Patent: Mar. 27, 2018

(54) SYSTEM AND METHOD FOR DISTRIBUTED CATEGORIZATION

(71) Applicant: NICE-SYSTEMS LTD., Ra'anana (IL)

(72) Inventors: Roi Amir, Kfar Yona (IL); Dan Sharon, Kfar Saba (IL); Eyal Strassburg, Hod HaSharon (IL)

(73) Assignee: NICE LTD., Ra'anana (IL)

( * ) Notice: Subject to any disclaimer, the term of this patent is extended or adjusted under 35 U.S.C. 154(b) by 0 days.

(21) Appl. No.: 15/271,900

(22) Filed: Sep. 21, 2016

(65) Prior Publication Data
US 2017/0011060 A1 Jan. 12, 2017

Related U.S. Application Data (63) Continuation of application No. 13/799,915, filed on Mar. 13, 2013, now Pat. No. 9,489,445.

(51) Int. Cl.
*G06F 17/30* (2006.01)

(52) U.S. Cl.
CPC .... *G06F 17/30165* (2013.01); *G06F 17/3012* (2013.01); *G06F 17/30194* (2013.01); *G06F 17/30598* (2013.01)

(58) Field of Classification Search
CPC ......... G06F 17/30165; G06F 17/30598; G06F 17/30194; G06F 17/3012
USPC ....................................... 707/740, 741, 764
See application file for complete search history.

(56) References Cited

U.S. PATENT DOCUMENTS

| | | | | |
|---|---|---|---|---|
| 6,061,398 A | * | 5/2000 | Satoh | H03M 7/40 341/65 |
| 7,953,219 B2 | * | 5/2011 | Freedman | G06Q 30/02 379/265.06 |
| 2003/0105654 A1 | * | 6/2003 | MacLeod | G06Q 10/10 709/223 |
| 2004/0249650 A1 | * | 12/2004 | Freedman | G06Q 30/02 705/7.29 |
| 2006/0101322 A1 | * | 5/2006 | Abbott | H04N 7/17318 715/203 |
| 2011/0302025 A1 | * | 12/2011 | Hsiao | G06Q 30/02 705/14.42 |
| 2012/0239558 A1 | * | 9/2012 | Zhang | G06Q 40/00 705/39 |

OTHER PUBLICATIONS

Shahar Faians et al., "Insight Manager R3.5 HLD", pp. 1-26, Jun. 9, 2013, Nice Systems Ltd.

* cited by examiner

*Primary Examiner* — Rehana Perveen
*Assistant Examiner* — Loc Tran
(74) *Attorney, Agent, or Firm* — Pearl Cohen Zedek Latzer Baratz LLP (57) ABSTRACT

A generic categorization method may include receiving interaction data on a distributed computing system operating on a plurality of computing nodes. The distributed computing system may distribute the received interaction data across the plurality of nodes. On each node, categorization rules may be applied to the interaction data via parallel processing. The results, which may include a category associated with each interaction, may be written to a distributed storage system. A user interface may allow a user to define the categorization rules and schemas of interaction data.

22 Claims, 8 Drawing Sheets

SYSTEM AND METHOD FOR DISTRIBUTED CATEGORIZATION

CROSS-REFERENCE TO RELATED APPLICATIONS

This application is a Continuation of, and claims priority to, U.S. patent application Ser. No. 13/799,915, entitled "SYSTEM AND METHOD FOR DISTRIBUTED CATEGORIZATION," filed Mar. 13, 2013, the entire contents of which are incorporated herein by reference in their entirety.

FIELD OF THE INVENTION

The present invention relates to categorizing interactions on a distributed computing system.

BACKGROUND

In an interaction two parties may exchange information. A person may exchange information with another person or, for example, an automated process such as a chat bot. An interaction may be, for example, between a customer and service representative. Categorization methods may involve tagging or labeling interactions according to predefined rules based on the interaction's content or according to metadata within the interaction data. A categorization method may use relational or columnar databases, such as SQL databases, for example, to store each interaction and its respective categories and tags. Schemas may be configured to parse different forms of the interaction data. After categorizing the interactions, the interactions may be available for later review through the input of queries such as SQL queries. The SQL queries may be used to locate the interactions that match a category definition encoded in the SQL query.

Implementing categorization methods on columnar or relational databases may have scale limitations in the number of interactions that can be categorized and stored, and the number of categories that may be generated or used. Matching millions of interactions against thousands of complex categories and rules may take hours in processing and writing to storage. Further, the schema for parsing the data and the SQL queries to retrieve data may be fixed for each type or form of data. New types of data may require the development of entirely different schemas and SQL queries.

SUMMARY

A generic categorization method may include receiving interaction data on a distributed computing system operating on a plurality of computing nodes. The distributed computing system may distribute the received interaction data across the plurality of nodes. On each node, categorization rules may be applied to the interaction data via parallel processing. The results, which may include a category associated with each interaction, may be written to a distributed storage system. A user interface may allow a user to define the categorization rules and schemas of interaction data.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

When used herein, the "web" may refer to the World Wide Web, which may include the Internet and/or an Intranet. The web may be used interchangeably with the Internet and/or Intranet, as the web is a system of interlinked hypertext documents and programs (e.g., VOIP (voice over Internet protocol) telephone programs, streaming media programs) accessed via the Internet and/or Intranet.

When used herein, a "distributed" file system or computing system may include any cluster or network of computers used to perform computing tasks, such as logic, processing, reading/writing of data, or other tasks. The network of computers may be connected through an internal intranet or public internet. The network of computers may be connected to a central or master processor which assigns tasks to each computer on the network, or node. Each computer may further include their own processors to perform tasks locally. Distributed processing systems may be especially suitable for processing large data sets, since the tasks distributed on each node may be processed in parallel. A programming model for processing large data sets on distributed systems may be the map reduce method, a well-known method in the prior art.

Embodiments of the invention provide a system and method for categorizing, labeling, describing, or tagging interactions between two parties, such as a customer and service representative, for example. In an interaction two people may exchange information, or a person may exchange information with an automated process such as a chat bot. The interactions may occur across different types of communication channels including, for example, Internet, Intranet, public network, private network, local area network, wide area network, messaging via text messaging, short message service (SMS) messaging, e-mail messaging, blogs or micro-blogs, radio, and telephone or calling channels. Within Internet interactions, multiple channels may be used. For example, an interaction including a telephone call may be conducted via the Internet on one channel, a web-browsing session may take place on a second channel, and a text interaction may take place on a third channel Interactions may be recorded between a customer and service representative over the multiple communication channels, such as the customer accessing an online support website, calling a call center, text messaging (communicating via text messaging), or through social media websites such as the Facebook social networking service, the Twitter social networking service, or the Foursquare social networking service, for example. The recorded interactions may have many different media types, such as, voice recordings, SMS messages, web screenshots, etc. The recorded interactions may be stored as raw data or may be processed, for example, by extracting information from the interactions according to predefined rules and known analytical methods. An interaction via the Internet between two parties may be any communication occurring between devices via the Internet. The interaction performed by the target may facilitate communication between two parties which are human users, such as a customer and a service representative, or allow a user to access content or media on the web, and may be between a human and a party which is an automated process. For example, a user or customer may have questions about a service, and ask questions to a chat bot or automated chatting service that provides answers to the customer. Communication between people on the Internet may include e-mail messages, instant messaging, blogging, VOW or posting messages on social networking websites. Accessing content on the web may include browsing news websites, accessing video content, or downloading music content. Other forms of interactions may occur between two parties. Although some embodiments are directed to interactions between a customer and customer service representative, the categorization process disclosed may be applied to other kinds of interactions across different communication channels, such as interactions during transactions, or multi-party discussions and negotiations between businesses.

The interactions may be categorized or described according to business needs or for later evaluation. Multiple categories may be assigned to one interaction. For example, a long duration telephone call between a customer and a credit card service representative about a lost card may be categorized as "long call", "lost card", or other categories, attributes, or characteristics depending on the content and metadata of the discussion between the customer and service representative. In another example, a public message sent via Twitter from a customer to a service representative may praise the representative for good service. The message may be categorized, tagged, labeled, or described as "good service". The interactions, interaction data and the categories assigned to them may be stored together in a database, for example They may be stored in table entries that include or point to the actual interaction. Client applications using the interactions data may retrieve the interaction and its related categories. For example, a client application may be a reporter system showing trend graphs of categories over time and enabling drill-down to the interaction data or the interactions themselves. Another client application may be the generic categorization application itself, which may evaluate rules and mark interactions with categories such as 'successful sale', 'no sale', or 'sales attempt'.

Other call categories may include: Non resolution calls, Repeat Callers, Agent Told Customer to Call Back, Calls containing an escalation, Calls Containing Transfers, Calls Containing Holds, Successful Sales, Sales Attempts, Customer Dissatisfaction, Feedback Provided. Other categories may be created and used.

Interaction data may be extracted or processed information from each interaction, according to known content analysis methods, such as text and speech extraction. If the interaction occurs over the Internet, the interaction data may be extracted from IP data packets or html, for example. The interaction data may be reformatted so that it can be read and evaluated by embodiments of the system and method described herein. Interaction data may result from processing the recording of an interaction, such as a call over the telephone, or a conversation over Twitter, for example. The interaction data may have different formats due to the different types of content included. For example, e-mail interaction data may have a different format than Skype interaction data.

Embodiments of the invention may provide a system and method for generically categorizing or describing interaction data. A generic categorization may mean a categorization without regard to the type of interaction described by the interaction data or the communication channel used in the interaction. A data processing system may receive interaction data on a distributed file system. The distributed file system may utilize a plurality of computing nodes. Many distributed filing systems may exist, including, for example, the Hadoop framework. Hadoop may provide a software framework that allows for the distributed processing of large data sets across clusters of computers using a simple programming model. Hadoop may be designed to scale up from a single server to thousands of machines, each offering local computation and storage. Instead of relying on the hardware of a few computers to deliver high-availability services, the Hadoop framework may detect and handle failures at the application layer, thus allowing a highly-available service on top of a cluster of computers, each of which may have risks for failures. Further, performance may be linearly scaled based on how many nodes are utilized in processing. For example, adding nodes may reduce performance time in a linear and predictable manner.

The categorization or description process according to embodiments of the invention may include two main phases. Other numbers and types of phases may be used. In some embodiments of the invention, a configuration phase and a runtime phase may be used. During the configuration stage, a field analyst or engineer, for example, may define the schema or template of interaction data in a schema manager. The schema manager may take an Extensible Markup Language (XML) file as input, or any other file in a markup language. A schema may be a template of interaction data that lists common characteristics of different types of interactions data. The common characteristics may originate from metadata present in the interactions data. For example, a "message" schema may include the following characteristics: from, to, title, and body. A more specific schema for email may further include time sent and time received, and may inherit the same characteristics of the message schema, based on the hierarchy. The schemas for each type or form of interaction data may be organized hierarchically so that similar interaction data types that share the same fields of data may relate to the same schema file, if desired for simplicity. The hierarchy may also allow efficient additions of new interaction data types. For example, a social media interaction schema may be placed higher in the hierarchy than more specific interactions, such as a Facebook interaction or a Twitter interaction. A user or analyst may have the option of using the social media interaction schema for all social media interactions, or the user may wish to specifically include separate schemas for specific types of social media interactions, such as a schema for Twitter interactions and a schema for Facebook interactions, while inheriting the more general characteristics of the social media interaction schema. The hierarchy may allow the same rules and categories to be applied across interactions of the same schema. For example, in all social media interactions, interactions may be categorized as "within network" (e.g., within a user's social network) or "out of network" (e.g., outside a user's social network). However, Twitter interactions may specifically include a category for "retweets" or "favorites", features that are unique to Twitter's social network. The hierarchy may allow all social media interactions to be assigned a "within network" or "out of network" category without the need for adding additional schema files even if interactions on new social media networks are evaluated. The hierarchy may allow flexibility for a user or analyst to categorize interactions based on specific features of a social media network, such as Twitter. For each schema, the schema manager may generate classes for an object-oriented computer language, such as the Java or C++ programming languages, for example. For interaction data that has a particular schema, an instance of the generated class specific to that schema may be created, and methods may be performed on the instances which apply categorization rules to the interaction data.

Categories and rules may also be defined or created during the configuration phase. The categories and rules may be based on for example business needs or goals. For example, a business goal may be to provide efficient and quality customer service. A rule may be to tag or label every telephone interaction that is less than two minutes, or to tag or label every email message that uses the words "good service". A user interface or graphical user interface may assist a business user to define the categories and rules, without requiring the business user to develop an XML file or code. In addition to categories and rule defined by a user, an analytics engine may automatically generate categories and rules based on defined schemas and the interaction data that exists. The analytics engine may employ machine learning algorithms or other methods. For example, a schema may define a characteristic of an interaction as "call duration". The analytics engine may automatically define categories as "short call" or "long call", and generate rules that apply the "short call" category to calls with duration of less than sixty seconds, and apply the "long call" category to calls with duration of sixty seconds or more.

Based on the rules, categories, and schemas, code or software may be generated which applies categorization rules to incoming interactions in the runtime phase. Each schema may be associated or linked with a particular class that includes methods to apply the categorization rules to a particular schema or interaction data. For example, the social media interaction schema may be associated with a class that categorizes social media interactions, and the email interaction schema may be associated with a class that categorizes email interactions. The generated code may be stored in a distributed file system, distributed database, or other storage, and later retrieved during the runtime phase. The runtime phase may include for example two steps (other numbers of steps may be used): initialization and evaluation. During initialization, as the data processing system receives data (new interaction data or by a user's request, for example), the code stored in the distributed file system may be loaded to a rule engine that may run or be executed across several computing nodes. The loaded code may be code that is specific to or associated with the schema of the received interaction data. In the evaluation step, the received interactions data may be distributed across multiple or a plurality of computing nodes. Using for example a map-reduce processing algorithm, the code of the rule engine may, when executed, apply the categorization rules to the distributed interactions data, via parallel processing. The results of the evaluation step may be written in parallel, or concurrently, to a distributed storage system, such as Hadoop Distributed File System (HDFS) or HBase, for example.

Figure 1:
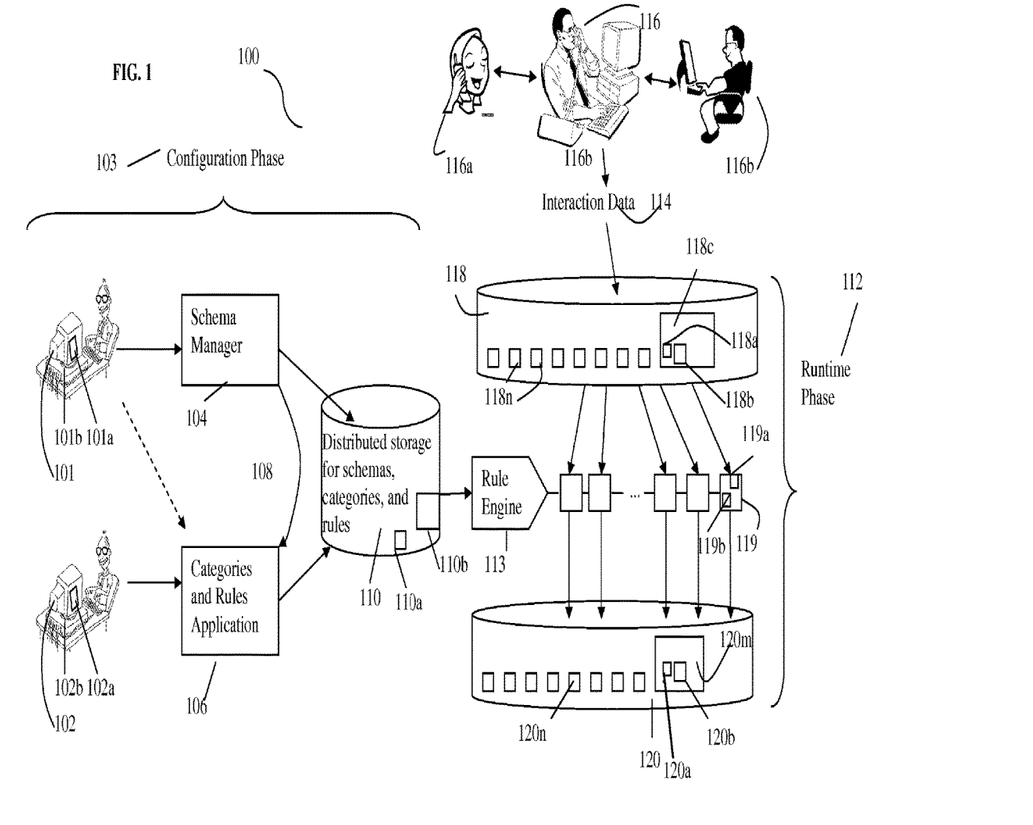
FIG. 1 is an illustration of a generic categorization system, according to embodiments of the invention.

FIG. 1 is an illustration of a generic categorization system, according to embodiments of the invention. During a configuration phase 103, a computer 101, including a processor 101a and memory 101b, may be accessed by a user, engineer, or analyst to define schemas of interaction data in a schema manager 104. The analyst may write schemas in a markup language such as XML, and input or edit the files into the schema manager 104. The schema manager 104 may include a user interface. Another user may access a computer 102, including a processor 102a and memory 102b, and use a categories and rules application 106 to define categories or descriptions that label each interaction and define rules that categorize or label the interactions, according to the definition of the categories. The categories and rules application 106 may include a graphical user interface for editing and creating the rules and categories, so that the user of computer 102 may not be required to have a technical background. Alternatively, the schema manager 104 and the categories and rules application 106 may run or be executed on the same computer or device. When discussed herein, a processor which may carry out all or part of a method as discussed herein, may be configured to carry out the method by, for example, being associated with or connected to a memory storing code or software which, when executed by the processor, carry out the method.

For every schema created, a class, such as a Java class, may be generated or created that defines methods and characteristics that an instance of the class would have. Other classes may be created based on the object-oriented programming language utilized, such as C++, or C#, for example. In other embodiments, classes need not be used. An instance of the class may be created when received interaction data is related to that particular schema. Further, based on the categories and rules created in the categories and rules application, code, programs, or methods may be generated or created that use the generated class to apply the rules to interaction data. The schema manager 104 may also automatically generate categories 108 based on the schemas created. These automatically generated categories may be used or sent to the categories and rules application 106, so that a user may create categorization rules to apply to interaction data. The schemas, generated classes, categories, rules, and generated code that applies categorization rules to interaction data may be stored in a storage or repository, such as a database, memory, or distributed memory system.

Data processing system 100 may receive interaction data 114 generated by interactions between a customer service representative 116 and a customer 116a, 116b. Other types of parties may interact and generate interaction data 114 from recorded interactions. The interaction data 114 may be generated through multiple types of communication channels, such as via telephone lines (as shown between customer 116a and representative 116) or via the Internet or web (as shown between customer 116b and representative 116), or both channels. Other channels may be used, such as VOW or facsimile, for example. The interaction data may be received and saved in a distributed storage system 118 such as a distributed memory system or distributed database, for example. The distributed storage system 118 may store the interaction data across multiple computing nodes 118n for later evaluation, or the interaction data 114 may be immediately distributed for evaluation. The distributed storage system 118 may include a master node 118c that distributes the task of writing the interaction to a local storage across the nodes 118n. The master node 118c may include a local processor 118a and memory 118b to distribute computing tasks. Each computing node 118n included in distributed storage system 118 may include a local processor and memory similar to master node 118c. The stored interaction data may be loaded across other computing or evaluation nodes 119 used for evaluation, for example. Each computing node 119 may include a local processor 119a and memory 119b for executing software loaded from the rule engine 113 to evaluate or apply rules to the distributed interaction data.

Computers 101 and 102, may each include one or more controller(s) or processor(s) 101a, and 102a, respectively, for executing operations and one or more memory unit(s) 101b and 102b, respectively, for storing data and/or instructions (e.g., software) executable by a processor. Schema manager 104 may be executed by processor 101a and categories and rules application 106 may be software executed by processor 102a. Further, distributed filing or computing systems 118 and 120 may include distributed cluster nodes 118a and 120a, respectively, for distributed storage and processing, and may include master processors 118c and 120m for assigning processing tasks across cluster nodes 118a and 120a. Processors 101a, 102a, 118a, 119a and 120a may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 101a, and 102a, and/or local caches and memory in cluster nodes 118a, 119a and 120a may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units. Computers 101 and 102 may include one or more input devices, for receiving input from a user or agent (e.g., via a pointing device, click-wheel or mouse, keys, touch screen, recorder/microphone, other input components) and output devices for displaying data to a customer and agent, respectively.

Figure 2:
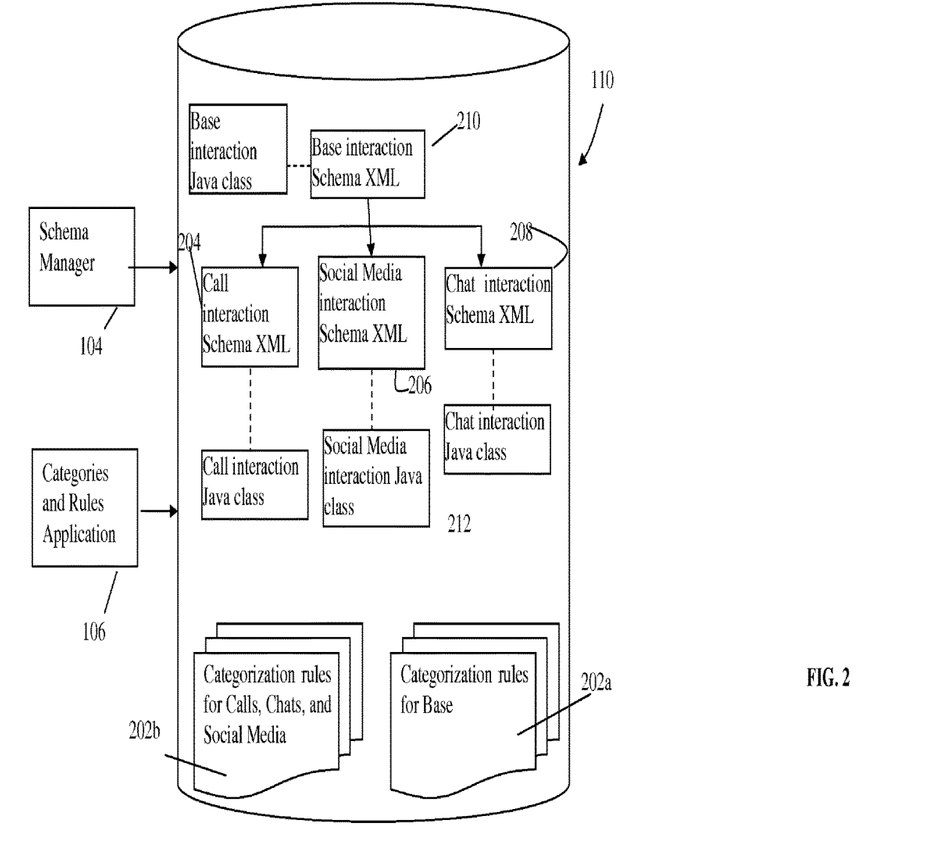
FIG. 2 is a schematic illustration of a repository for schemas, categories, rules and generated code to apply the rules and categories, according to an embodiment of the invention.

FIG. 2 is a schematic illustration of a repository 110 for schemas, categories or descriptions, rules and generated code to apply the rules and categories, according to an embodiment of the invention. The schema manager 104 may save or store each defined schema in a markup language format, such as XML, to a repository 110. Repository may be any database, memory, or distributed memory system, such as Hadoop Distributed File System (HDFS) or HBase, for example. The schema manager 104 may generate a Java class 212 for each schema and store the Java class in the repository 110. Other object-oriented computing languages may be used. The schemas and generated Java classes may have a hierarchical structure. For example, a base schema 210 may include the most basic characteristics of interaction data, such as participants, duration, and domain A categories and rules application 106 may generate code according to defined categories, rules, and schema for the base class and save or write the code 202a to repository 110. Below the base schema 210, schemas for call interactions 204, social media interactions 206, chat interactions 208, or schemas for other types of interactions may be created. Each of those schemas may be associated with a Java class 212. These schemas may inherit characteristics from the base schema 210, and may include more specific characteristics according to the type of desired interaction. For example, a call interaction schema may further include phone number or sentiment, based on the detection of emotion in a customer's voice. Other characteristics may be used for a call interaction. For a chat interaction schema 208, characteristics such as time stamp or chat client, may be included, for example. The categories and rules application 106 may generate code according to input from an analyst or other user to apply categorization rules for call, chats, and social media 202b. From repository 110, the generated code that applies categorization rules to interaction data may be loaded to a rule engine (see FIG. 1).

Figure 3A:
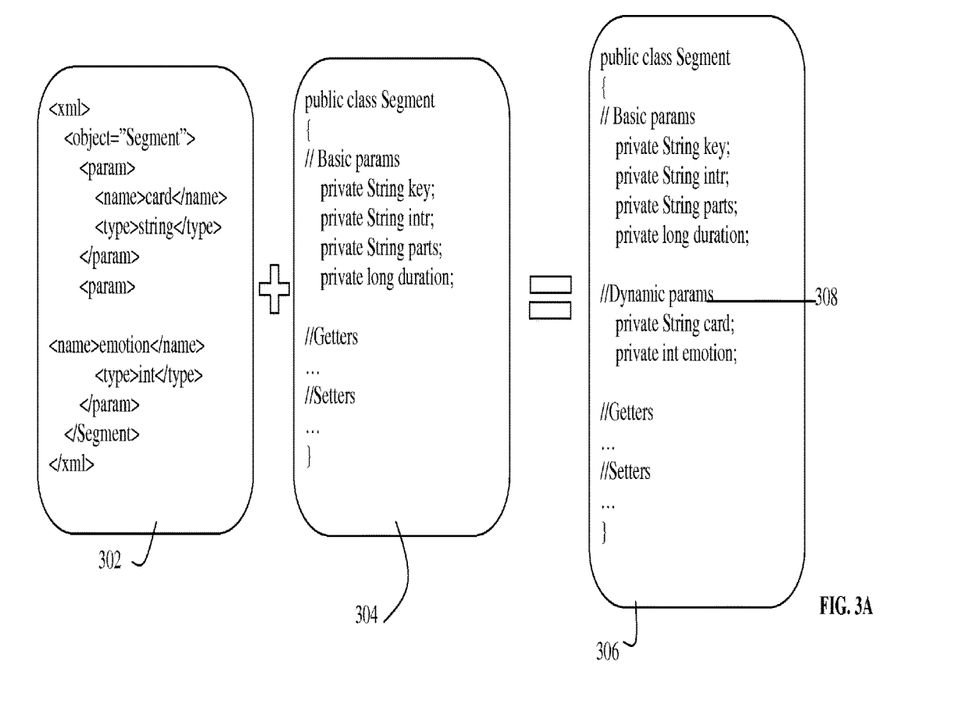
FIG. 3A is an illustration of a class generated by a schema manager, according to an embodiment of the invention.

FIG. 3A is an illustration of a class generated by schema manager, according to an embodiment of the invention. A user may input, create, define, or edit an XML schema 302, for example, and load it to a schema manager. The XML schema 302 may include parameters or characteristics for a type of interaction data. A generic interaction data type "Segment" may include parameters or characteristics such as "card" or "emotion", as shown. The schema manager may read and combine the parameters in the XML schema 302 with a generic class template 304. The resulting generated class 306 may be a Java class, for example, that includes the basic parameters from the generic class template 304 and parameters defined by the XML schema 302 (indicated by the "Dynamic params" 308). Along with defined categories and rules, generated code or instructions from a categories and rules application may apply categorization rules to interaction data.

The schema manager may include a set of base Java classes which describe the relation between classes. For example, a base Java class may define a segment as having a list of categories. The base classes also have basic members such as identification (ID) and name. These basic members are described in the base schema XML, which may corresponds to the base class. The base schema of the Segment schema, for example, may have two XML fields: ID and name. The corresponding base Java class, BaseSegment may also have two members: ID and name. When the field engineer or analyst wishes to enhance the base schema and add fields, the analyst may edit the schema XML files by adding, editing, or removing fields as needed. The enhanced schema XML may inherit characteristics from the base schema XML. During code generation, a processor may read the XML file and create or derive a class which inherits from the base class. The created class may be generated based on the fields that were edited in the schema XML file. Thus, for each communication channel the schema manager may have a package of inherited classes that may be derived from the base classes. The derived classes have all the members (e.g., ID and name) that are specific for this channel and they may be dynamically changed by the field analyst. The analyst may not require any code development in order to introduce new fields and members to the system.

Figure 3B:
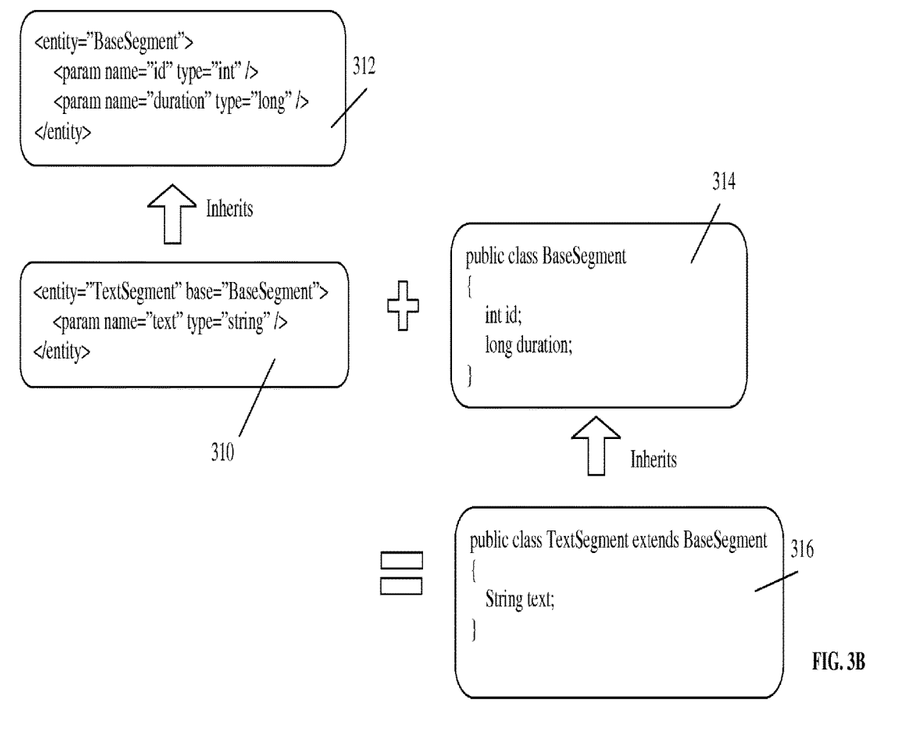
FIG. 3B is a flow diagram illustrating schema XMLs that inherit characteristics from a base XML, according to an embodiment of the invention.

FIG. 3B is a flow diagram illustrating schema XMLs that inherit characteristics from a base XML, according to an embodiment of the invention. As with elsewhere in this application, the specific code and definitions are for example only, and other code and definitions may be used. Schema XMLs such as TextSegment XML 310 may inherit characteristics from BaseSegment XML 312. A processor may generate a corresponding BaseSegment class 314 from BaseSegment XML 312. BaseSegment class 314 and BaseSegment XML 312 may both include fields for example for ID and duration. Since the TextSegment XML 310 may inherit these fields from BaseSegment XML 312, TextSegment class 316 generated from the TextSegment XML 310 may inherit the ID and duration parameters from the BaseSegment class 314.

Figure 4:
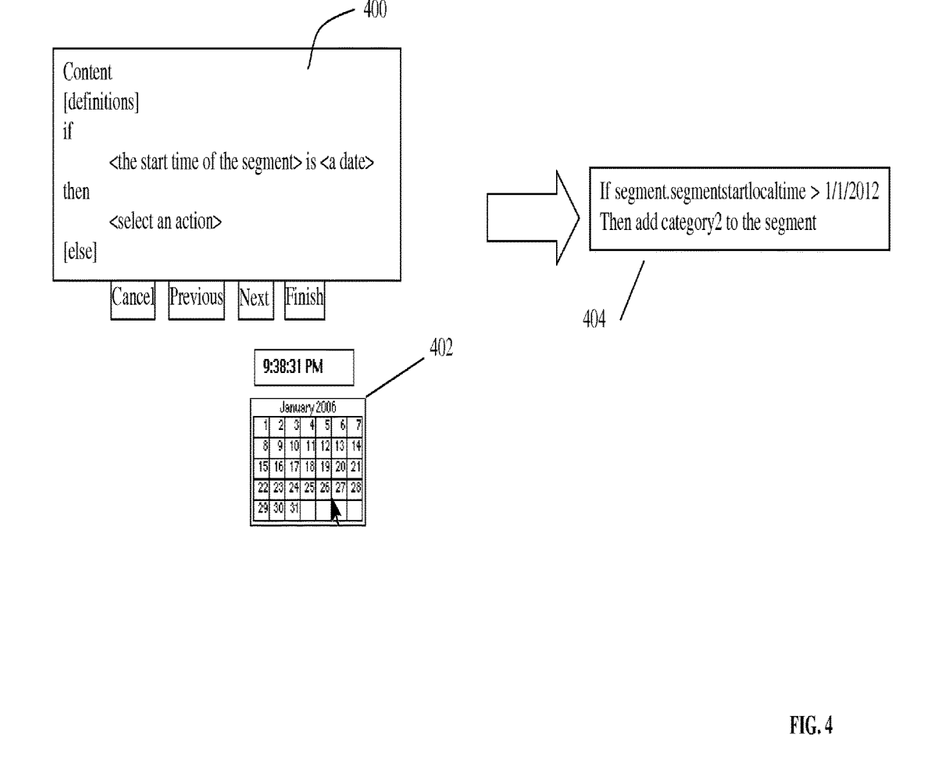
FIG. 4 is an example of a user interface for defining categories and rules, according to an embodiment of the invention.

FIG. 4 is an example of a user interface 400 for defining categories and rules, according to an embodiment of the invention. User interface 400 may enable an engineer or analyst to define rules and categories in a readable, non-technical form. The analyst may be able to choose a date for a start time of a segment, for example, and apply it to a categorization definition. A categories and rules application may take input from the analyst and generate or produce logic rules 404 in the form of code or machine instructions that can be applied to interaction data. The logic rules may be loaded to a rule engine and applied on a plurality of computing nodes, for example.

Since schemas may inherit from other schemas that are higher in hierarchy, relevant rules that fit with the schemas of incoming interaction data may be applied. Applying rules that are not relevant to schemas of incoming interaction data may otherwise throw exceptions and lead to unknown results, which may be avoided. When an analyst creates or writes a new rule that relates to one or more objects (e.g., instances from different Java classes generated from different XML schemas), the rule may be available for all previous object versions and upcoming object versions. Thus, rules may be applied to an object and all other inheritance objects. For example, a rule that is written for social networking interactions may be applied to inheritance objects of the social networking interaction object, such as a Facebook interaction or Twitter interaction.

Figure 5:
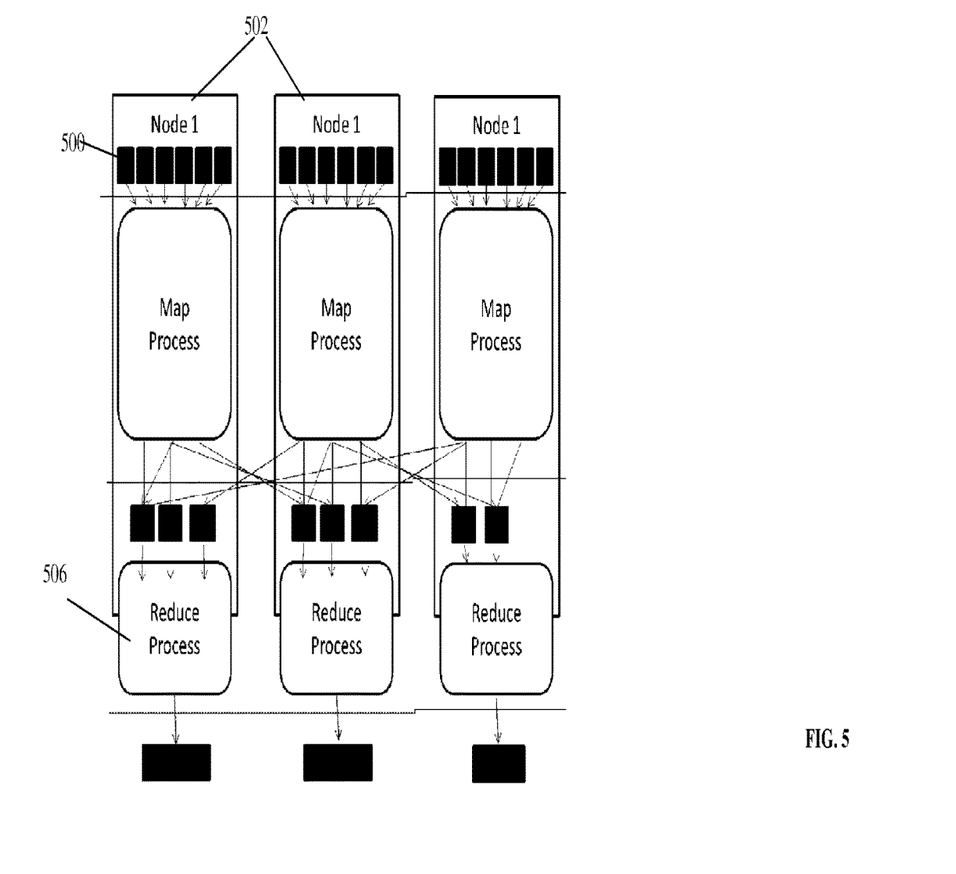
FIG. 5 is a schematic illustration of a map-reduce process performed on a plurality of computing nodes, according to an embodiment of the invention.

FIG. 5 is a schematic illustration of a map-reduce process performed on a plurality of computing nodes, according to an embodiment of the invention. Interaction data may be split into interaction data segments 500 which may already reside on a plurality of nodes 502 in a distributed file system, from processing that occurred at an earlier time, for example. Interaction data segments 500 from different interactions may reside on different nodes 502.

Interaction data may be determined or processed from interactions using well-known methods such as data extraction or signal processing algorithms. For example, a telephone call interaction may be processed with voice signal processing algorithms to extract the content of the call. The content of the call, along with the call's metadata, may be included as interaction data. The interactions data may be split up into segments 500 and distributed across the nodes 502.

For example, in a telephone call where a customer is transferred from one agent to another, the interaction data may be split into two segments, as shown below:

| InteractionID | SegmentID | Text | Agent | Node |
|---|---|---|---|---|
| A | Null | Null |  | 1 |
| A | A1 | "Hello" | 10 | 1 |
| A | A2 | "Bye" | 20 | 2 |

The interaction ID A may include three rows that represent its extracted interaction data. The first row may be the complete data, and references the aggregate interaction. The second row may be the segment that was handled by agent with ID 10, and the third row may be the segment of the call that was transferred to the agent with ID 20. The last column in the table may represent a node in the cluster that stores the specified segment of the interaction data. In the above table, the segment representing the aggregate call and the first segment may be on the same node, and the last segment may be located on another cluster node. As with other data structures shown herein, other or different data structures may be used.

During runtime initialization, a map process on each node may distribute the interaction data segments 500 to different processing or evaluation nodes. Upon initialization, code that applies categorization rules related to the loaded interaction data may be loaded to the rule engine, and the code may be distributed to each node 502. The code may be mapped or organized into binary codes. The binary codes may be constructed by Huffman coding all the parameters or fields used in the rules. Huffman coding may translate the most frequently used parameters or fields into shorter binary codes. Less frequently used parameters may have longer binary codes. For example, more frequently used parameters may be "name" or "start time" since most interactions may be defined by these parameters. Less frequently used parameters may be "call duration", since in some embodiments this may only apply to voice calls, and may not be applicable to social media interactions. (Other embodiments may be applicable to social media.) The binary codes of the parameters or fields that make up a rule may be concatenated so that each rule is identified by a unique binary code or binary hash string. The rules and their binary hash strings may be organized in a radix tree or compact prefix tree, where each node in the tree includes at least two children, and the more frequent parameters may be closer to the root node. When an interaction data segment is processed, the radix tree may be traversed based on the fields and parameters in the interaction data segment to determine which rules to apply to the interaction data segment. The rules that are applied may be set aside or saved in another hash table for later use, as further interaction data segments may be processed.

In a Hadoop cluster, data may be distributed to all the nodes of the cluster as it is loaded in. The HDFS may split large data files into chunks which may be managed by different nodes in the cluster. Although the interaction data may be distributed across several machines (e.g., nodes 118 and 120), it may be treated or known to the nodes as a single file. Individual input files may be broken into lines or other format that are specific to the application logic. The Hadoop framework may schedule the processing of the split interaction data on different computing nodes based on the nodes' proximity to the location of the split interaction data. This may alleviate strain on network bandwidth and prevent unnecessary network transfers, since most processes will occur locally on each node. The interactions may be distributed and replicated in the cluster without a specific order, but the analyst may decide to execute some rules before others. For example, the analyst may first categorize the telephone calls that have duration longer than three minutes as "long calls" and then categorize whether those telephone calls included a hold by a service representative. The distributed file system may, in parallel, run or process these rules on the distributed interaction data.

An instance, such as a Java object, may be created for each interaction data segment 500. The interaction data segments 500 that comprise the same interaction may be aggregated or correlated and then distributed across the plurality of nodes 502 for the reduce process 506. During the reduce process 506, categorization rules from the rule engine (see FIG. 1) may be applied to each interaction. Since the interactions are distributed across a cluster of nodes 502, each interaction may be processed or evaluated in parallel. The results, which associate a category with an interaction, may be rewritten back to the distributed file system or another memory system.

An interaction divided or split up into interaction segments may identify each segment with an identifier, such as a segment ID. The Hadoop framework may manage where to store and process each segment and its associated interaction data. For example, the distributed file system may keep track of a table for interaction A:

| InteractionID | SegmentID | Duration |
|---|---|---|
| A | Null | 7 |
| A | A2 | 4 |
| A | A3 | 1 |
| A | A4 | 2 |

The first row may be the entire interaction A, and its segments A2, A3, and A4 in the rows below. The duration of entire interaction A may be the total of all its segments, A2, A3, and A4. Each segment may reside on a different node, for example. For performance optimization, a processor in the distributed file system may apply the rules on each segment locally at each node, or may send the segment to other nodes with free processing resources.

Once the rules are applied to each interaction data segment, the following table may result:

| Category ID | Interaction ID | Segment ID |
|---|---|---|
| 1 | A | Null |
| 1 | A | A2 |
| 2 | A | A3 |
| 1 | A | A3 |
| 4 | A | A4 |

As shown, the same interaction segments (e.g., A3) may have different categories, depending on the applicable rules. The overall category of interaction A, for example, may have one or multiple categories.

Figure 6:
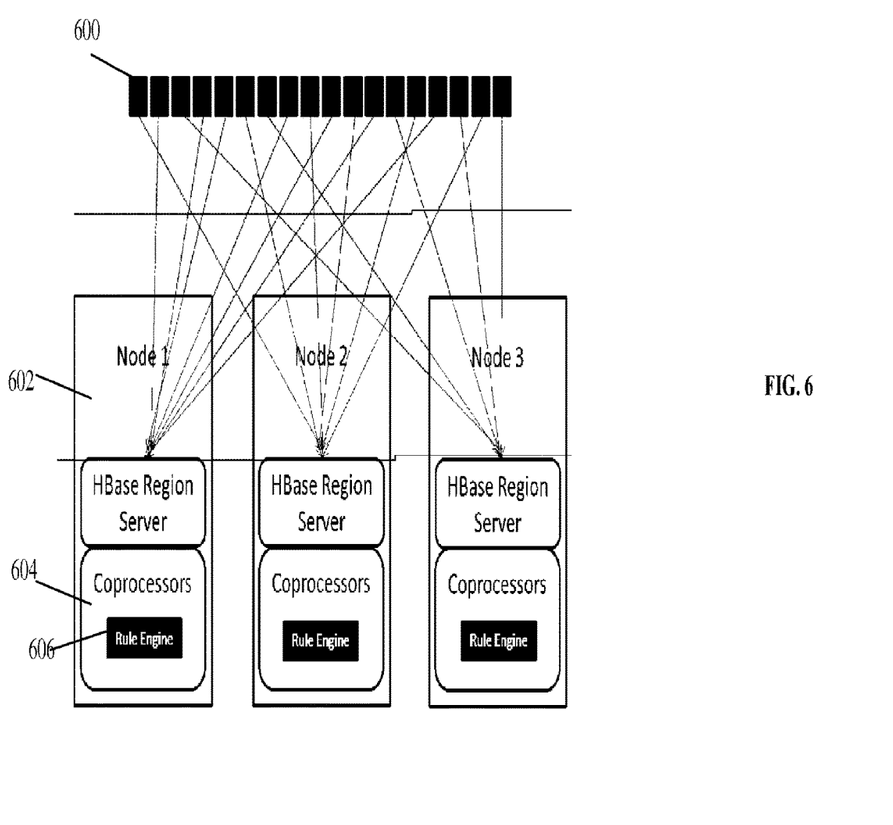
FIG. 6 is a schematic illustration of a map-reduce process performed on a plurality of computing nodes in real-time, according to an embodiment of the invention.

FIG. 6 is a schematic illustration of a map-reduce process performed on a plurality of computing nodes in real-time, according to an embodiment of the invention. Segments of interaction data 600 may stream into a data processing system, described herein. The streamed interaction data segments 600 may be distributed to a distributed cache or storage system, such as HBase, for example, which comprises a plurality or cluster of computer nodes 602. Processors or coprocessors 604 on each node may load the rule engine's rules 606 to each node and apply the relevant categorization rules to the interaction data segments. Since the distribution process in HBase generally keeps data clustered according to its data key or ID, the segments of interaction data that are part of the same interaction may likely be received on the same local node.

Figure 7:
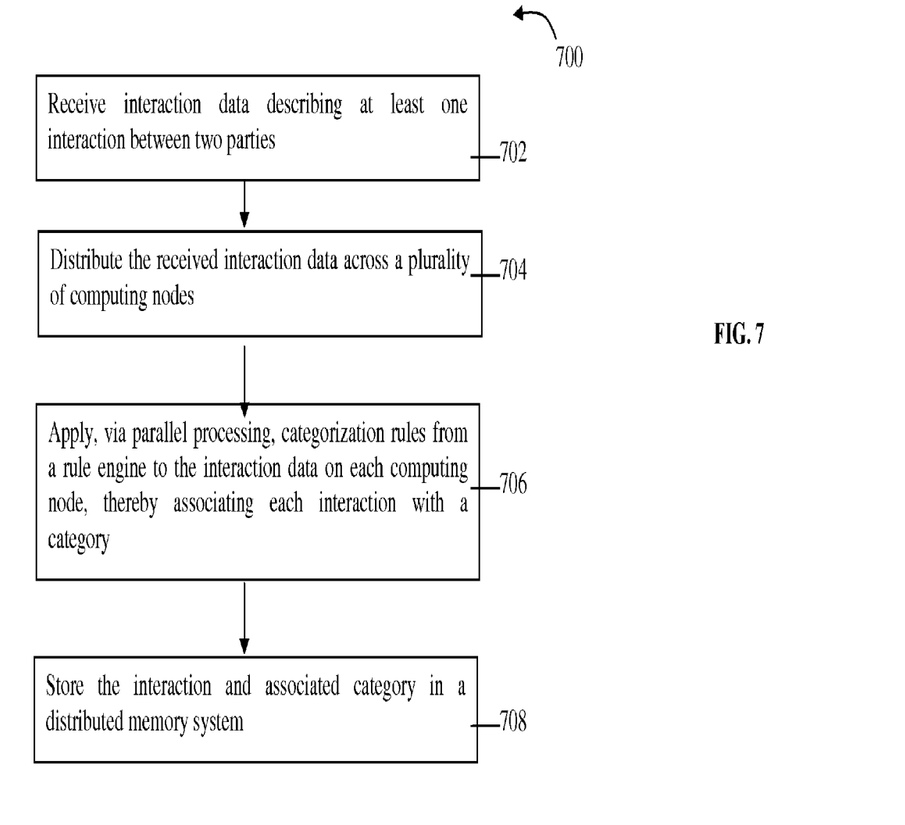
FIG. 7 is a flowchart of a generic categorization process, according to an embodiment of the invention.

FIG. 7 is a flowchart of a generic categorization process 700, according to an embodiment of the invention. A generic categorization process 700 may receive interaction data describing at least one interaction between two parties in operation 702. The process 700 may be implemented on a distributed computing system, such as Hadoop, for example. The interaction may occur over different communication channels, such as through telephone, email, chat, or social networking websites, for example. In operation 704, the received interaction data may be distributed across a plurality of computing nodes. In operation 706, categorization, tagging, labeling or description rules may be applied to the interaction data on each node. The rules may be loaded from a rule engine that loads relevant rules related to the schema of the received interaction data. The evaluation of the interaction data may result in a category, tag, label or description that is associated with each interaction. In operation 708, the interaction and associated category may be stored in a distributed memory system. Other or different operations may take place.

Different embodiments are disclosed herein. Features of certain embodiments may be combined with features of other embodiments; thus certain embodiments may be combinations of features of multiple embodiments.

Embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

What is claimed is:

1. A data processing method for distributed categorization, comprising:
receiving, on a distributed computing system comprising a plurality of computing nodes, interaction data describing at least one interaction between parties, the at least one interaction including an exchange of information between parties;
wherein the at least one interaction occurred across two or more different communications channels; and
wherein the interaction data is received from the two or more different communications channels;
splitting the interaction data from each interaction into two or more interaction data segments, each interaction data segment including a type of interaction data, wherein if more than one agent is represented in an interaction, each agent is represented in a separate data segment;
assigning an interaction identifier to each of the two or more interaction data segments, the same interaction identifier being assigned to data segments associated with the same interaction;

assigning a different segment identifier to each of the two or more interaction data segments associated with the same interaction;

distributing the received interaction data across the plurality of computing nodes by transmitting each of the two or more interaction data segments to a different one of at least two or more computing nodes of the plurality of computing nodes;

defining a plurality of schemas including characteristics of a type of interaction data, wherein the schemas are organized hierarchically so that schemas inherit common characteristics from schemas that are higher in hierarchy;

applying, via parallel processing, one or more categorization rules from a rule engine based on a schema of the interaction data type, to each segment of the two or more interaction data segments on each respective computing node of the plurality of computing nodes, thereby assigning to each segment of the two or more interaction data segments a category;

assigning to each interaction, via parallel processing, one or more categories; and after applying rules, storing each segment of the two or more segments and the assigned category in a distributed memory system in a table indexed by interaction identifier and segment identifier.

2. The data processing method of claim 1, wherein the one or more categorization rules are applied to each segment of the two or more interaction data segments according to a map-reduce implementation.

3. The data processing method of claim 1, comprising loading the one or more categorization rules associated with a schema of the received interaction data into the rule engine.

4. The data processing method of claim 1, comprising organizing the one or more categorization rules through Huffman coding, based on a frequency of defined rule parameters.

5. The data processing method of claim 1, comprising:
receiving input from a user describing at least one schema of the interaction data;
defining one or more categories associated with each schema; and
defining the one or more categorization rules based on the defined categories.

6. The data processing method of claim 5, comprising generating code that applies the one or more categorization rules to the interaction data based on at least one of the schema, the one or more categories, and the one or more categorization rules.

7. The data processing method of claim 6, comprising storing the generated code on a distributed file system.

8. The data processing method of claim 5, wherein defining the one or more categories associated with the schema comprises automatically generating categories based on the schema.

9. A data processing system for distributed categorization, comprising:
a distributed file system comprising a plurality of processors on a plurality of computing nodes, wherein the processors:
receive interaction data describing interactions between parties, each interaction including an exchange of information between parties;
wherein the at least one interaction occurred across two or more different communications channels; and
wherein the interaction data is received from the two or more different communications channels;
split the interaction data from each interaction into two or more interaction data segments, each interaction data segment including a type of interaction data, wherein if more than one agent is represented in an interaction, each agent is represented in a separate data segment;
assign an interaction identifier to each of the two or more interaction data segments, the same interaction identifier being assigned to data segments associated with the same interaction;
assign a different segment identifier to each of the two or more interaction data segments associated with the same interaction;
distribute the received interaction data across the plurality of computing nodes by transmitting each of the two or more interaction data segments to a different one of at least two or more computing nodes of the plurality of computing nodes; and
define a plurality of schemas, each listing characteristics of a type of interactions data, wherein the schemas are organized hierarchically so that schemas inherit common characteristics from schemas that are higher in hierarchy;
apply, via parallel processing, one or more categorization rules from a rule engine based on a schema of the interaction data type, to each segment of the two or more interaction data segments on each respective computing node of the plurality of computing nodes, thereby assigning to each segment of the two or more interaction data segments a category; and
a distributed memory system which stores, after the rules are applied, each segment of the two or more segments and the assigned category in a table indexed by interaction identifier and segment identifier.

10. The data processing system of claim 9, wherein the processors apply the one or more categorization rules to each segment of the two or more interaction data segments according to a map-reduce implementation.

11. The data processing system of claim 9, wherein the processors load the one or more categorization rules based on a schema of the received interaction data into the rule engine.

12. The data processing system of claim 9, further comprising a processor, wherein the processor:
receives input from a user defining at least one schema of the interaction data;
defines one or more categories associated with the schema; and
defines the one or more categorization rules based on the defined categories.

13. The data processing system of claim 12, wherein the processor generates code that applies the one or more categorization rules to the interaction data based on at least one of the schema, the one or more categories, and the one or more categorization rules.

14. The data processing system of claim 12, wherein the automatically generates categories based on the schema.

15. The data processing system of claim 13, wherein the processor stores the generated code on a distributed file system.

16. A data processing apparatus, comprising:
at least one processor wherein the processor defines one or more schemas of interaction data and to define one or more categorization rules associated with each schema, wherein each of the schemas including characteristics of a type of interactions data, wherein the schemas are organized hierarchically so that schemas inherit common characteristics from schemas that are higher in hierarchy;
a distributed file system comprising a plurality of processors, wherein the processors:
receive interaction data describing a plurality of interactions between parties, each interaction including an exchange of information between parties;
wherein the plurality of interactions occurred across two or more different communications channels; and
wherein the interaction data is received from the two or more different communications channels;
split the interaction data from each interaction into two or more interaction data segments, each including a type of interaction data, wherein if more than one agent is represented in an interaction, each agent is represented in a separate interaction data segment;
assign an interaction identifier to each of the two or more interaction data segments, the same interaction identifier being assigned to data segments associated with the same interaction;
assign a different segment identifier to each of the two or more interaction data segments associated with the same interaction;
distribute the received interaction data across a plurality of computing nodes by transmitting each of the two or more interaction data segments to a different one of at least two or more computing nodes of the plurality of computing nodes;
load one or more categorization rules associated with the one or more schemas of the received interaction data on each computing node;
apply, via parallel processing, the loaded one or more categorization rules to each segment of the two or more interaction data segments on each respective computing node of the plurality of computing nodes, resulting in at least one category being assigned to each segment of the two or more interaction data segments;
assign to each interaction, via parallel processing, one or more categories; and
after applying rules, store each segment of the two or more segments and the assigned category in a distributed memory system in a table indexed by interaction identifier and segment identifier.

17. The data processing apparatus of claim 16, wherein the distributed file system applies the loaded one or more categorization rules to each segment of the two or more interaction data segments according to a map-reduce algorithm.

18. The data processing apparatus of claim 16, wherein the distributed file system stores each segment of the two or more segments and the assigned category in a distributed cache system.

19. The data processing apparatus of claim 16, wherein the at least one processor defines categories based on the schema.

20. The data processing apparatus of claim 16, further comprising a repository which stores the schemas and defined one or more categorization rules.

21. The data processing method of claim 1, further comprising creating a class that inherits one or more fields of data from a base class of schema based on a communication channel scheme.

22. The data processing method of claim 5, wherein the schema is based on a type of communication channel for the respective segment of the two or more interaction data segments.

* * * * *